May 26, 1959      D. BERLIN      2,888,061
CHILD'S SIT OR STAND CAR SEAT
Filed May 26, 1958
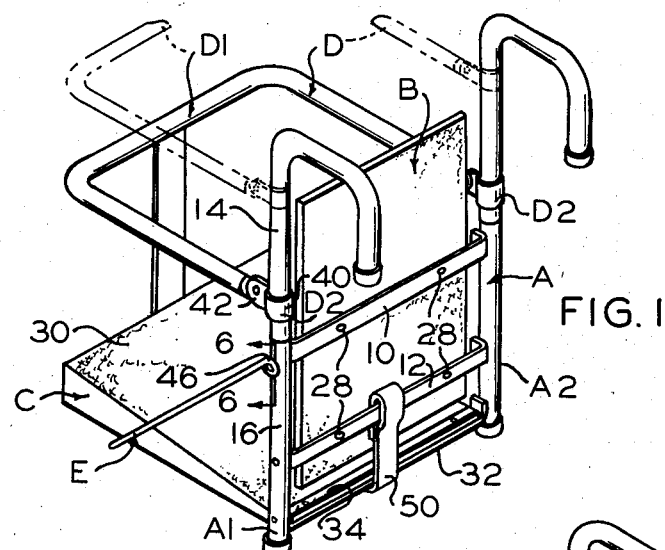
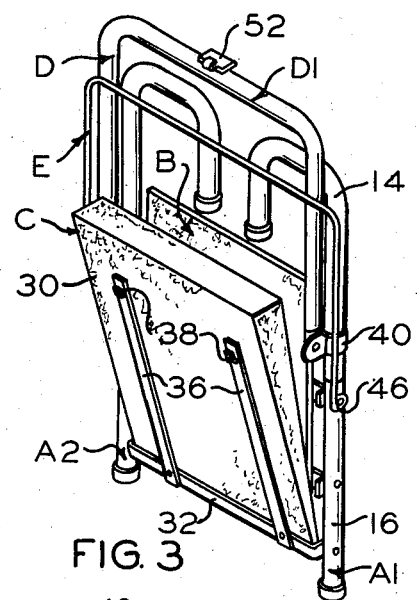
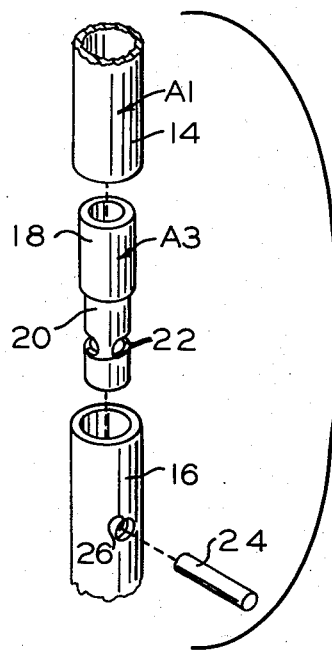
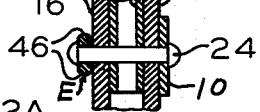
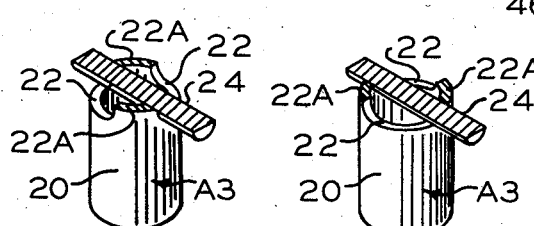
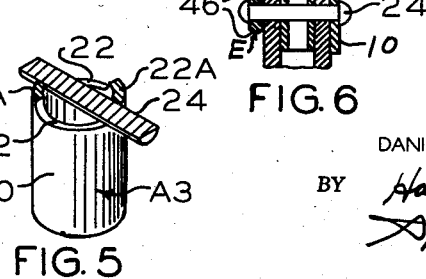
INVENTOR.
DANIEL BERLIN
BY Harry Langram
          Stanley Bilker
ATTORNEYS

United States Patent Office 2,888,061
Patented May 26, 1959

2,888,061

CHILD'S SIT OR STAND CAR SEAT

Daniel Berlin, Philadelphia, Pa.

Application May 26, 1958, Serial No. 737,859

2 Claims. (Cl. 155—11)

My invention relates to a child's auxiliary automobile seat and more particularly relates to a collapsible seat wherein a child may be firmly supported in either a sitting or standing position.

The automobile seat described herein is an improvement over the auxiliary automobile seat described in my prior Patent No. 2,774,411, granted December 18, 1956. The present seat is adapted to support and secure small children from the time that they are just able to sit upright until they are three or four years old, and to restrain the child in a sitting or standing position providing substantial support in either of said positions. Furthermore, the present seat is adapted as a booster for an ordinary household chair in order to elevate the child at a comfortable position at the table. In addition, the construction of the present invention enables adjustment of the restraining bar to maintain the child securely in position when standing throughout the child's early growth.

It is an object of my invention to provide an auxiliary automobile seat that will firmly support and restrain a child therein in either a sitting or standing position.

Another object of my invention is to provide a child's auxiliary automobile seat wherein the horizontal seat element will be positively supported in a safe and comfortable sitting position.

Another object of my invention is to construct a means for supporting the seat element of a collapsible car seat whereby the useful life will be extended.

Another object of my invention is to construct an auxiliary automobile seat arranged to permit a child to be placed therein or removed therefrom with a minimum of difficulty.

Another object of my invention is to construct an auxiliary automobile seat wherein the seat may be easily converted from a sitting to a standing position or returned from standing to sitting position.

Another object of my invention is to provide an auxiliary automobile seat that is readily folded into compact arrangement for storage at home or in the automobile.

Another object of my invention is to provide an auxiliary automobile seat that may be easily converted into a booster seat for use upon a household chair in order to elevate the child to a comfortable sitting position at the table.

Another object of my invention is to provide an auxiliary automobile seat wherein continual adjustment may be made to restrain the child in standing position during all phases of his early growth.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing, in which:

Fig. 1 is a rear perspective view of a child's sit or stand car seat embodying my invention.

Fig. 2 is an exploded view of the frame elements embodying my invention.

Fig. 3 is a perspective view of the automobile seat in collapsed position.

Fig. 4 is a fragmentary perspective view of the frame member rotated in position for extension.

Fig. 5 is a fragmentary perspective view of the frame member rotated in collapsed position.

Fig. 6 is a sectional view taken along lines 6—6 of Fig. 1.

Referring now in greater detail to the drawing in which similar reference characters refer to similar parts, I show a child's sit or stand car seat comprising a frame, generally designated as A, a back rest element, generally designated as B, a seat element, generally designated as C, a restraining bar, generally designated as D, and a brace, generally designated as E.

The frame A comprises a pair of tubular support members A1 and A2 held in spaced relation with each other by a pair of transverse ribs 10 and 12. Each of the support members A1 and A2 comprises a tubular member bent in the form of a hook and having a vertical arm 14 in alignment with and rotatable upon a vertical side member 16. An insert A3 of tubular construction serves to couple the arm 14 with the vertical side member 16 and comprises a collar 18 which is complementary with and pressed into the inner diameter of the tubular arm 14. The neck 20 extends downwardly from the collar 18 and is of slightly lesser diameter therefrom and is adapted to freely rotate within the inner diameter of the side member 16. Slots 22 are formed in the neck portion 20 of the insert A and are diametrically opposite therein to permit insertion therethrough of a pin 24 which passes through an aperture 26 in the side member 16. Since the insert A3 is securely pressed within the inner diameter of the hook member 14 it is integral therewith and each of the hooks 14 is permitted to freely rotate within the side members 16. However, each of the slots 22 occupies approximately 90 degrees of arc and the webbing elements 22A intermediate the slots 22 act as stops to permit rotation of the suspending hooks 14 into a plane perpendicular with the back rest element B, as shown in Fig. 1, or into a plane substantially parallel with the back rest B, as shown in Fig. 3.

The back rest element B comprises a substantially rectangular cushioned board which is secured in a substantially vertical plane to the ribs 10 and 12 by a plurality of rivets 28.

The seat element C is also made of plywood or a pressed wood slab 30, the rear end of which is sandwiched in between a seat support member 32 and a reinforcing strip 34. Suitable padding material is placed upon the upper surface of the slab and is covered by a decorative fabric which is sewed about the edges thereof to form an envelope about the entire slab. The construction of the back rest element with respect to padding and fabric is identical. The seat support member 32 has right angle ends which are pivotally secured to the lower ends of the side members 16 of the frame supports A1 and A2 respectively. Mounted upon the bottom of the seat element C are a pair of spaced straps 36 which are riveted thereto and each of which has an L-shaped keeper 38 which is adapted to slidably catch and restrain therein the seat supporting brace E.

The restraining bar D comprises the tubular U-shaped element D1 pivotally secured at each end thereto to a sliding bracket D2. The bracket D2 comprises a flanged portion 40 which slidably embraces the arm 14 of the suspending hook, and a pair of ears 42 which pivotally embrace the flattened ends of the U-shaped restraining bar D1. The upper portion of the flattened ends of the U-shaped restraining bar D1 are rounded to permit vertical pivoting of the restraining bar D into a plane substantially parallel with the back rest element B. However, when the restraining bar D is lowered into a plane perpendicular with the back rest element B, the ends of the U-shaped bar D1 abut the vertical arm of the frame members A to restrict the downward positioning of the restraining bar D with respect thereto. It is to be observed that the sliding brackets D2 may be raised into any vertical position along the arms 14 of the frame members A1 and A2 since the flanges 40 frictionally engage the outer periphery of their respective vertical arms 14 instead of having a loose sliding fit. When the restraining bar D is lowered into a horizontal position, any pressure at the forward portion thereof tends to wedge the flange 40 of the bracket D2 upon the respective support members A1 and A2 and restricts downward vertical movement thereon. In order to raise or lower the sliding brackets D2 and the restraining bar D, it is necessary to exert pressure directly upon the flanges 40 by the fingers to prevent any wedging action.

The brace E comprises a U-shaped rod having its ends curled into an eyelet 46, each of which is maintained in pivotal relationship with the frame A by the pin 24 which has its ends peened over. As shown in Fig. 6, the other end of each of the pins 24 is peened over the right angle ends of the rib 10 to maintain an integral fixed relation. Thus, it is to be observed that the brace E is free to swing about the pins 24, and is also adapted to positively support the seat elements C in horizontal position when the bight portion of the U-shaped brace is clasped within the slot created between the L-shaped keepers 38. It is further to be noted that the brace E may be used alone or in combination with a supporting strap 50 having one end looped about the transverse rib 12 and the other end adapted to engage by an eyelet (not shown) thereon to a keeper 52 on the intermediate bight portion of the restraining bar D.

The strap 50 serves a dual purpose. It may be used by itself or in combination with the brace E in maintaining the seat element C in a horizontal position. In this manner the strap 50 is extended upward in front of the seat element between the legs of the child seated therein, thus preventing the child from sliding down and out of the seat. When the auxiliary seat is arranged for standing position, the seat element C is permitted to swing into a vertical position and the strap 50 extends between the seat support member 32 and the back rest element B, the strap itself being hooked upon the restraining bar keeper 52. In the standing position, the strap 50 extends between the legs of the child whereby the child may freely stand and yet utilize the strap as a form of seat should he tire, and wherein adequate protection is afforded for preventing the child from sliding down and out from under the restraining bar D. As the child grows, the restraining bar D may be slidably elevated to the upper portion of the frame members A1 and A2 to provide adequate support. In addition, the length of the strap 50 may be increased by a suitable loop provided thereon (not shown).

Although my invention has been described in considerable detail, such description is intended as being illustrative, rather than limiting, since the invention may be variously embodied, and the scope of the invention is to be determined as claimed.

I claim:

1. In a child's sit and stand car seat having a stationary back member supported between a pair of frame members and a seat member pivotally mounted with respect to the back rest member, each of said frame members comprising a stationary tubular side member, an upper tubular suspending member, and an insert securely pressed within the inner diameter of said suspending member and having a neck freely rotatable within the inner diameter of said side member, a pair of diametrically opposite slots in said neck, a pin slidable within said slots, and a seat brace member pivotally mounted on said pins and in combination therewith whereby said suspending member is rotatable into a plane perpendicular to said back member or adapted to be rotatable into a position substantially coplanar with said back rest member.

2. The invention of claim 1 wherein a bracket is slidably supported on each of said tubular suspending members each of said brackets comprising a flange frictionally embracing the periphery of said tubular suspending members, a pair of ears extending from each of said flanges, and a U-shaped restraining bar having flattened ends pivotally supported between the corresponding pairs of ears whereby said restraining bar may be elevated upon the seat as the child grows.

References Cited in the file of this patent

UNITED STATES PATENTS

| | | |
|---|---|---|
| 1,039,647 | Carter | Sept. 24, 1912 |
| 2,546,790 | Shook | Mar. 27, 1951 |
| 2,723,709 | Welsh | Nov. 15, 1955 |

FOREIGN PATENTS

| | | |
|---|---|---|
| 162,201 | Australia | Mar. 25, 1955 |